United States Patent

Dantiki et al.

[11] Patent Number: 5,973,097
[45] Date of Patent: Oct. 26, 1999

[54] ALDIMINE BASED COATING COMPOSITIONS AND PIGMENT DISPERSIONS

[75] Inventors: Sudakhar Dantiki, Toledo; David W. Braun, Whitehouse, both of Ohio; Rajnikant P. Shah, Moorpark, Calif.; Bradley M. Richards, Maumee, Ohio; Thomas J. Laginess, Lambertville, Mich.; Henry J. Stateczny, Whitehouse, Ohio; Brian P. Koevenig, Lambertville, Mich.

[73] Assignee: BASF Corporation, Southfield, Mich.

[21] Appl. No.: 08/806,797

[22] Filed: Feb. 26, 1997

Related U.S. Application Data

[63] Continuation-in-part of application No. 08/451,373, May 26, 1995, abandoned, which is a continuation of application No. 08/254,211, Jun. 6, 1994, abandoned.

[51] Int. Cl.$^6$ .................. C09D 175/02; C08G 18/18; C08G 18/06; C08G 18/28
[52] U.S. Cl. .................. 528/49; 528/68; 528/73; 524/237; 524/450; 524/714; 524/791
[58] Field of Search .................. 528/52, 53, 48, 528/60, 73, 49, 68; 524/237, 714, 450, 791

[56] References Cited

U.S. PATENT DOCUMENTS

| | | | |
|---|---|---|---|
| 5,214,086 | 5/1993 | Mormile et al. | 524/237 |
| 5,444,117 | 8/1995 | Wade et al. | 524/590 |
| 5,466,771 | 11/1995 | Hicks et al. | 528/64 |
| 5,489,704 | 2/1996 | Squiller et al. | 560/35 |
| 5,516,873 | 5/1996 | Hicks et al. | 528/60 |
| 5,523,376 | 6/1996 | Hicks et al. | 528/44 |
| 5,545,705 | 8/1996 | Hicks et al. | 528/44 |
| 5,559,204 | 9/1996 | Squiller et al. | 528/84 |
| 5,661,216 | 8/1997 | Laginess et al. | 524/871 |

FOREIGN PATENT DOCUMENTS 1064841  4/1967  United Kingdom.

*Primary Examiner*—Jeffrey C. Mullis
*Attorney, Agent, or Firm*—Anne Gerry Sabourin

[57] ABSTRACT

The present invention relates to a coating composition and a pigment dispersant comprising aldimine having the formula

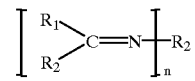

wherein $R_1$ is alkyl, aryl, cycloaliphatic or substituted alkyl, aryl, cycloaliphatic or heterocyclic group, and $R_2$ is monomeric or polymeric aliphatic, aromatic, arylaliphatic or cycloaliphatic group which may contain O, N, S, or Si.

The coating composition further comprises:
  b) an isocyanate compound having ubetdione functionality,
  c) at least one moisture absorbing compound, and
  d) acid catalyst, wherein the coating composition demonstrates increased pot life and decreased dry time.

5 Claims, No Drawings

ALDIMINE BASED COATING COMPOSITIONS AND PIGMENT DISPERSIONS

RELATED APPLICATIONS

This application is a continuation in part of U.S. Ser. No. 08/451,373 filed on May 26, 1995, now abandoned, which is a continuation of U.S. Ser. No. 08/254,211 filed Jun. 6, 1994, now abandoned.

BACKGROUND OF THE INVENTION

1. Field of the Invention

The present invention relates to aldimine based coating compositions, aldimine based pigment dispersions, and coating compositions containing the aldimine dispersions.

2. Description of the Prior Art

It is known in the art to use dialdimines, diketimines and hindered diamines to modify polyol compositions to decrease overall viscosity of a polyol composition, while maintaining and improving network building and overall physical properties. This is disclosed in Mormile et al. U.S. Pat. No. 5,214,086.

It is known in the art to utilize coating compositions comprising aldimines and isocyanates containing uretdione functionality. This is disclosed in Patent GB 1, 064, 841, to Haggis. However, coating compositions comprising aldimines and uretdiones exhibit problems of short pot life, due to moisture in the coating system introduced by solvents, impurities in the system, hydration of pigments or fillers and atmospheric moisture. The presence of moisture in the system requires introduction of moisture scavengers that slow down dry time. It is an object of the present invention to provide coating compositions containing aldimine and uretdione isocyanates with improved pot life and to provide a method for improving the pot life of these coating compositions. It is a further object of the invention to improve dry or cure times for these coating compositions.

An additional object of the present invention is to provide pigment or filler dispersions comprising aldimine for use in a coating composition including isocyanate having uretdione functionality and coating compositions comprising these pigment dispersions.

SUMMARY OF THE INVENTION

The present invention relates to a coating composition having no hydroxy-functional resin, comprising
a) aldimine having the formula

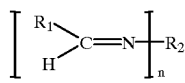

wherein
R$_1$ is alkyl, aryl, cycloaliphatic or substituted alkyl, aryl, cycloaliphatic or heterocyclic group, and R$_2$ is monomeric or polymeric aliphatic, aromatic, arylaliphatic or cycloaliphatic group which may contain O, N, S, or Si,
b) an isocyanate compound having uretdione functionality,
c) at least one moisture absorbing compound, and
d) acid catalyst,
wherein the coating composition demonstrates increased pot life and decreased dry time.

The present invention defines a process for increasing pot life and decreasing dry time of a coating composition comprising aldimine and uretdione isocyanate, comprising adding moisture scavengers and acid catalyst to said coating composition.

The present invention further includes a dispersant composition for use in coating compositions comprising an isocyanate compound having uretdione functionality and including no hydroxyl functional resins comprising
a) aldimine having the formula

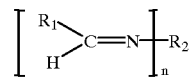

wherein
R$_1$ is alkyl, aryl, cycloaliphatic or substituted alkyl, aryl, cycloaliphatic or heterocyclic group, and R$_2$ is monomeric or polymeric aliphatic, aromatic, arylaliphatic or cycloaliphatic group which may contain O, N, S, or Si, and
b) compounds selected from the group consisting of fillers, extenders, pigments and mixtures thereof.

Pigment wetting agents and/or solvents may optionally be used.

The dispersant of the present invention is used in a coating composition free of hydroxyl containing resins and cured with isocyanate crosslinking agents having uretdione functionality. The resultant dispersions have surprisingly lower viscosity and good anti-settling characteristics and optionally can be made solvent-free.

The present invention also relates to a process for preparing pigment, filler and/or extender dispersions in aldimine compositions wherein the pigment, filler or extender is dispersed in the presence of the aldimine and optionally with other compounds such as pigment wetting agents, solvent, and mixtures thereof.

The coating compositions including the dispersants of the present invention can be ambient cured or baked to cure. The coatings are especially useful as automotive refinish and industrial paint compositions. The compositions can contain well known paint additives such as catalysts, flow and wetting agents, mar and slip agents, anti-settling and anti-sag agents, etc.

The coating compositions can be of low volatile organic content (VOC), and in fact zero VOC, but the invention is not limited to only low VOC compositions. A range of VOC's can be obtained in part by the choice of the aldimine and the isocyanate components and also by the choice of co-reactants.

DETAILED DESCRIPTION OF THE INVENTION

The present invention relates to a coating composition containing no hydroxyl functional resin, comprising
a) an aldimine having the structure

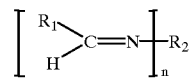

wherein
n averages greater than 1,
R$_1$ is alkyl, aryl, cycloaliphatic or substituted alkyl, aryl, cycloaliphatic or heterocyclic group, and R$_2$ is monomeric or polymeric aliphatic, aromatic, arylaliphatic or cycloaliphatic group which may contain O, N, S, or Si, and b) at least one isocyanate compound having uretdione functionality, c) at least one moisture absorbing compound, and d) acid catalyst.

Difunctional aldimines of the invention are obtained from the reaction between a diamine and one or more types of aldehyde. Examples of aliphatic diamines include, but are not limited to: ethylene diamine, ethylene Glycol diamine, propylene glycol diamine, hexamethylene diamine, 1,3-diaminopentane, 2-methyl-1,1,5-diaminopentane, 1,8-diaminooctane and 1,10-diaminodecane. According to the invention, 1,3-diaminopentane, hexamethylene diamine, 2-methyl-1,5-diaminopentane are preferred. Examples of cycloaliphatic diamines include, but are not limited to compounds having the following structures:

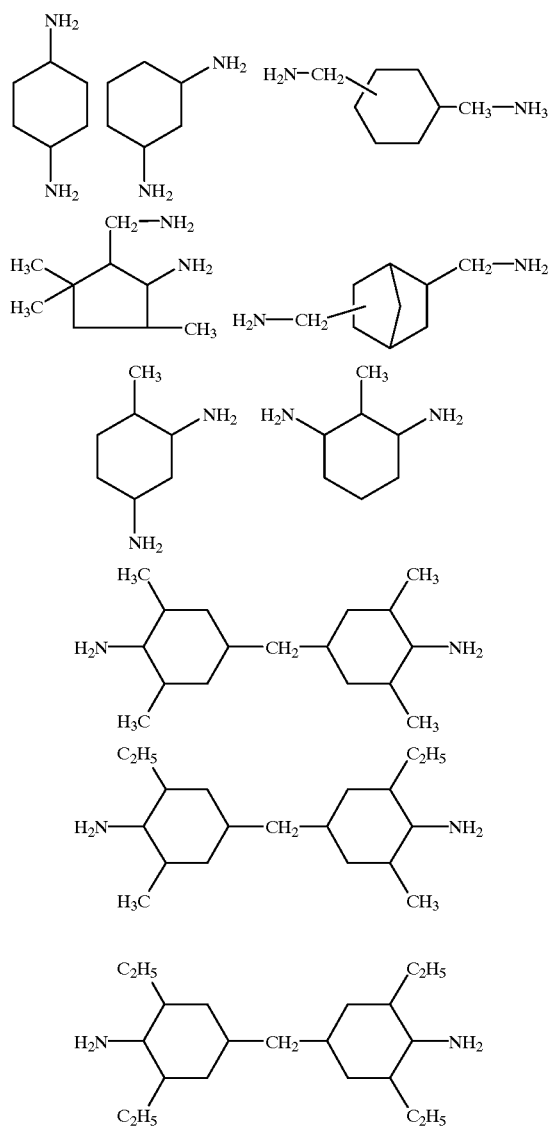

Preferred cycloaliphatic diamines include

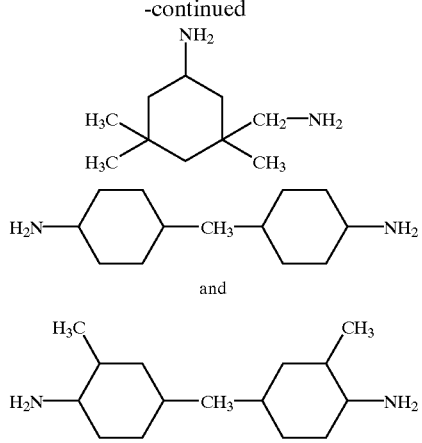

and

Trifunctional aldimines useful in the invention are obtained from the current reaction between a primary-amine and one or more types of aldehyde. Examples of preferred triamines are 4-methylamino-1,8-diaminooctane and the polyoxyalkylamines available from Texaco Chemical under the trademark Jeffamine® T-series.

A polyfunctional aldimine can be prepared from a polyfunctional primary amine. Polymeric aldimines of the invention are obtained from the reaction product of a polymer with pendant primary amine functional groups and an equivalence of an aldehyde. A variety of synthetic strategies can be employed to prepare these primary amine functional polymer, for example, an N-vinyl formamide copolymer to which the formamide groups are subsequently hydrolyzed to yield the free primary amine. Alternately, aldimine functional groups can be grafted directly onto a reactive group on a polymer chain or other multifunctional molecule by imminating a primary amine which has an additional reactive group that is complementary to a reactive group on the polymer chain and is unaffected by the Schiff base formation.

Aldehydes suitable for use in accordance with the invention include, but are not limited to those preferably containing 1 to 8 carbons such as propionaldehyde, butyraldehyde, pivalaldehyde, isobutyraldehyde, 2-methylbutanal, heptaldehyde, 2-ethylbutraldehyde, valeraldehyde, isocaleraldehyde, hexaldehyde, octyl aldehyde, methoxyacetaldehyde, methyl ester of 2-methyl-3-oxopropanoic acid, methyl ester of 2,2-dimethyl-3-oxopropanoic acid, benzaldehyde, anisaldehyde, 2-methylbenzaldehyde, nicotinaldehyde and cyclopropanecarboxaldehyde, also suitable are 9-ethyl-3-carbazolecarboxaldehyde, diphenylactaldehyde, 10-methylanthracene-9-carboxaldehyde and pyrenecarboxaldehyde.

Useful isocyanates containing uretdione functionality are derived from any aliphatic, cycloaliphatic, or aromatic isocyanate that is susceptible to dimerization. Typical examples include hexamethylene diisocyanate, isophorone diisocyanate, ethylene diisocyanate, propylene diisocyanate, 1,5-naphthalene diisocyanate, 1-methyl-2,4 diisocyanato cyclohexane, xylenediisocyanate, 1-methyl-2,4-diisocyanatobenzene, 4,4-diisocyanatodicyclohexyl methane, toluene-2,4-diisocyanate, o-, m-, and p-xylene diisocyanate, blocked isocyanates, and the like. According to the preferred embodiment of this invention, hexamethylene diisocyanate is used. The free isocyanate content may be partially blocked with any suitable mono-functional active hydrogen compounds such as alcohols, primary or secondary amines, oximes, and the like.

The compatibility of the uretdione isocyanates toward the aldimine compounds can be utilized to incorporate additional isocyanate compounds in the coating composition. By co-blending other isocyanate compounds with the uretdione, the other isocyanate compounds which are not usually compatible with the aldimine compounds are made compatible with the aldimine. Compatibility is desirable to ensure haze- and defect-free coating films.

The coating composition of the present invention preferably comprises as the isocyanate functional compound i) 5–100% of a compound selected from the group consisting of aliphatic, aromatic, and cycloaliphatic uretdiones and mixtures thereof, and ii) 0–95% of a compound selected from the group consisting of aliphatic, aromatic, and cycloaliphatic isocyanurates, biurets, allophanates, oxadiazenetriones and isocyanate functional polymers.

This invention also relates to improving the compatibility characteristics of aldimine compounds in the presence of isocyanates compounds by proper selection of the amine and aldehydes used to formulate the aldimine compound. It is also shown in the examples of the present invention that aldimines provide lower VOC than ketimines, and that aldimines demonstrate improved pot life over ketimines and thus aldemines are preferred over ketimines for purposes of the present invention. The coating compositions of the present invention are able to obtain a volatile organic content of less than 2.8 pounds per gallon. Some formulations according to the present invention provide compositions having VOC of less than 1.0 pound per gallon.

The imine/isocyanate reaction is favored when moisture is present, and accordingly, the pot life of the coating composition is reduced in the presence of moisture. Moisture may be introduced through the pigment, impurities in the additives to the coating, or may be absorbed from the atmosphere. Controlling the rate of reaction of aldimine/isocyanate becomes more complex in presence of moisture from sources within the coating composition and due to various humidity and temperature conditions. According to the present invention, the moisture in the coating is controlled by the addition of compounds known in the art as molecular sieves such as sodium potassium alumino silicate, sodium alumino silicate, calcium alumino silicate and potassium alumino silicate. Other suitable moisture scavengers include oxazolidines and desiccants. The proper levels of moisture scavenger can be used to keep the desired amount of moisture in the dispersion to aid in achieving a proper balance of pot life and cure of the coating film. Moisture scavengers are used in an amount between 0.1 and 10.0% by weight, preferably 0.2 to 2.0% based on total coating composition weight.

Other components such as secondary amine reactive diluents may be added to the coating composition. These diluents may increase the dry or cure time of the coating composition.

In cases where little or no moisture is present a catalyst may be added to speed the reaction of the aldimine and isocyanate to decrease the dry or cure time of the coating film. Acid catalysts include aromatic or aliphatic carboxylic acids or arylsulfonic acids.

The coating composition may also include pigments such as, but not limited to, titanium dioxide, graphite, carbon black, zinc oxide, cadmium sulfide, chromium oxide, zinc sulfide, zinc chromate, strontium chromate, barium chromate, lead chromate lead chromate lead cyanamide, lead silico chromate, chromium oxide, zinc sulfide, yellow nickel titanium, yellow chromium titanium, red iron oxide, yellow iron oxides, black iron oxide, naphthol reds and browns, anthraquinones, dioxazine violet, isoindoline yellows, arylide yellow and oranges, ultramarine blue, phthalocyanine complexes, amaranth, quinacridones, halogenated thioindigo pigments, extender pigments such as magnesium silicate, aluminum silicate, calcium silicate, calcium carbonate, fumed silica, barium sulfate, zinc phosphate.

Organic solvents common to the art may be used. Suitable solvents include aromatics like toluene and xylene, esters like alkylacetates of $C_1$ to $C_{20}$ alcohols such as n-Butanol, ketones like 2-butanone and methyl isobutyl ketone and the like.

The coating composition comprises only non-hydroxyl functional resins that are reactive toward the isocyanate functional compounds, thereby allowing them to become crosslinked into the coating matrix.

Coating compositions described by the present invention find utility in applications of ambient film forming and curing such as automotive refinish and industrial coatings. It is also suggested that the present invention applies to coatings to be force dried or baked. Forced dry conditions range from 100° F. to 190° F. Baking conditions common to the art may range from 175° F. to over 375° F. The coating cure process for the present invention may be accelerated by the utilization of radiant heating or Infra Red emitting devices known to the art.

Coating compositions described by the present invention find utility as clearcoats, basecoats, topcoats and undercoats.

The present invention relates to a coated substrate prepared by coating a substrate with a coating of the present invention. Any substrate material can be coated with the coating composition according to the present invention. These substrate materials include such things as glass, ceramics, paper, wood, and plastic. The coating system of the present invention is particularly adapted for metal substrates, and specifically as an automotive refinish system. The substrate may be uncoated material or can be primed. The substrate may also be coated with paint products applied at the time of manufacture or just prior to application of the compositions of the present invention. The coating composition can be applied using conventional spray equipment or high volume low pressure spray equipment resulting in a high quality finish. Other modes of application are roller coating, brushing, sprinkling, flow coating, dipping, electrostatic spraying, or electrophoresis. Exemplary metal substrates include such things as steel, aluminum, copper, zinc, magnesium and alloys thereof.

The present invention also relates to a pigment, filler or extender dispersion containing the aldimine compounds as described herein, for use in coating compositions containing isocyanate compounds with uretdione functionality. The pigment, filler or extender is dispersed in the aldimine. Optionally, pigment wetting agents, solvents and mixtures thereof may be added to the dispersion. The aldimine may be used as the pigment grind vehicle. Suitable solvents include aromatic solvents such as toluene, xylene, esters such as alkylacetates of $C_1$ to $C_{20}$ alcohols such as n-butanol and ketones such as isobutyl ketone.

Pigments suitable for use in the dispersions of the present invention include those useful in the coating compositions described above.

The use of aldimine as a pigment dispersant or grinding vehicle provides a low VOC dispersion with good anti-settling characteristics and optionally can be made solvent-free.

Equipment suitable for dispersing the compositions of this invention are those known to the art such as high speed dissolvers, ball mills, sand mills, horizontal mills, and the like.

The following non-limiting examples are intended to be illustrative of the present invention.

EXAMPLES

All quantities are shown on a weight basis unless otherwise indicated. All non-volatile tests are according to ASTM D-3960-90, all weight/gallon determinations are according to ASTM D-1475-90. All VOC determinations include the use of the above test methods.

ALDIMINE #1 is the reaction product of one mole of isophorone diamine with two moles of isobutyraldehyde.

ISOCYANATE HARDENER #1 was prepared under inert, anhydrous atmosphere by mixing 850.0 grams of an isocyanate resin comprising approximately a 2:1 molar ratio mixture of hexamethylene diisocyanate uretdione and hexamethylene diisocyante isocyanurate, 40.0 grams of urethane grade butyl acetate, 40.0 grams Ektapro EEP, and 70 grams of isobutyl acetate. The mixture was filled into a closed container under inert anhydrous atmosphere.

CATALYST SOLUTION #1—A 15% solution of benzoic acid by weight based on total solution weight, in methyl amyl ketone.

Examples 1 and 2

Pigments are ground in aldimine. Moisture content in the dispersion is controlled, resulting in coatings with improved properties. Sealers for Examples 1 and 2 were prepared by dispersing the following ingredients in Aldimine #1 using a high density polyethylene jar (shaker mill). The following components were charged to the plastic jar containing 800 grams of zirconia/silica beads and milled on the shaker for about 1 hour until the desired grind was achieved. The temperature of 55° C. was reached. The sealer was made by adding additional aldimine and mixing for an additional 10 minutes.

| Ingredient | Example 1 Comparison Grams | Example 2 improved process Grams |
| --- | --- | --- |
| Aldimine #1 | 116.54 | 116.54 |
| Butyl Acetate | 48.37 | 48.37 |
| Oxo-hexyl Acetate | 3.62 | 3.62 |
| Trialkylaryl ammonium hectorite | 0.72 | 0.72 |
| Pigment wetting agent | 5.21 | 5.21 |
| P M Acetate | 8.44 | 8.44 |
| rheology control additive | 11.29 | 11.29 |
| filler (Wollastonite ® ES-10) | 102.04 | 102.04 |
| Calcium Carbonate | 127.56 | 127.56 |
| Titanium Dioxide | 35.72 | 35.72 |
| Zinc phosphate | 153.06 | 153.06 |
| Novacite ® L-207-filler | 91.83 | 91.83 |
| sodium potassium alumino silicate (Purmol ® 3ST) | — | 10.20 |
| Aldimine #1 | 23.31 | 23.31 |
| Butyl Acetate | 15.00 | 23.70 |
| Aldimine #1 | 32.81 | 33.65 |
| TOTAL | 775.52 | 795.251 |
| Sealer Grind | 16 microns | 15 microns |

The utility of the above sealers is shown below in an isocyanate cure system. The sealers were reacted with Isocyanate Hardener #1, using Catalyst Solution #1. The acid catalyst level of 1.7% by weight on aldimine solids was used. Both of the sealers were sprayed over Taupe primers (dry sanded with 320 grit and clean wiped with pre-cleaning solution). A commercial 2K urethane monocoat was sprayed after 20 minute flash of the sealers in the booth. The panels were cured for 1 hour@140° F. and post-cured overnight at room temperature before testing. Pot life, dry time, initial adhesion, VOC's of the sealers, etc. were measured as follows.

| | Example 1a | Example 2a |
| --- | --- | --- |
| Sealer of Example 1 | 236.356 | — |
| Sealer of Example 2 | — | 236.356 |
| Isocyanate Hardener #1 | 90.929 | 89.135 |
| Catalyst Solution #1 | 5.964 | 5.840 |
| Butyl Acetate | — | 6.500 |
| Properties: | | |
| Isocyanate Index | 1.1 | 1.1 |
| Pigment/Binder | 1.2 | 1.2 |
| Initial Viscosity (Ford #4 cup) | 22.0" | 20.0" |
| Pot life (2 × visc.) | 80 minutes | 110 minutes |
| Dry Time (sealer) | 35' | 25–30' |
| Temperature ° F. | 76 | 76 |
| % Relative humidity | 26 | 26 |
| VOC, lbs/gal | | |
| Determined | 2.03 | 2.14 |
| Theoretical | 1.64 | 1.88 |
| % loss of Theo. VOC | 23.78% | 14.01% |
| Initial Adhesion | | |
| Sealer/primer | Gt0 | Gt0 |
| Top coat/sealer/primer | Gt0 | Gt0 |
| 20° Gloss (Top coated) | 85–86 | 85–86 |

The dry time is determined by using a BK Drying Recorder. The BK Drying Recorder is a film integrity tester. A 1.0 to 1.3 mil (dry) film of paint is spray applied to a 1" by 12" glass slide. The slide is immediately placed into the tester and testing is started. The tester pulls a 1.5 mm round end rod (held vertically) across the surface of the paint film at a consistent rate so the mark left on the film can be analyzed and the time that the nature of the mark changes can be recorded. The dry time as determined for these examples is the time when the film has set enough that the rod will ride on top of the paint film instead of being pulled through the film.

The adhesion test was performed as per ASTM method D3359, test method B using a cutter which spaces the cuts 2 mm apart and make 6 cuts. The percent adhesion loss is expressed according to scale of Gt0 to Gt5. The ratings along with the corresponding percent adhesion loss is as follows: Gt0=0% loss; Gt1=1–5% loss; Gt2=6–15% loss Gt3= 16–35% loss; Gt4=36–65% loss; Gt5=66–100% loss.

From Example 1 and 2, it is seen that by controlling the level of moisture in the pigmented base, the pot life can be improved.

Examples 3 and 4

Aldimine pigment dispersions were made by blending the following ingredients as indicated.

ALDIMINE #1 (see above).

RED MILL BASE 68.2% of Aldimine #1 and 31.8% of C.I. Pigment Red 254.

WHITE MILL BASE 43.5% of Aldimine #1 and 56.5% of Titanium Dioxide.

ISOCYANATE HARDENER #2 a mixture of hexamethylene diisocyanate uretdione and hexamethylene diisocyanate isocyanurate in an approximate molar ratio of 2:1.

Example 3

| Ingredient | Amount (grams) |
| --- | --- |
| Red Mill Base | 110.0 |
| Aldimine #1 | 123.3 |

The Red Mill Base was charged into a nine ounce glass jar. To disperse the pigment, 300 grams of 1.6–2.0 mm zirconia/silica beads were added to the jar. The jar was sealed and put on a Cyclone air operated paint shaker for thirty minutes resulting in a grind of 8 Hegman. To convert the mill base, Aldimine #1 was added and then shaken for additional 5 minutes. The resulting paint recovered by filtration has a viscosity of 33 seconds in a #4 Ford cup. 100 grams of this mixture was blended with 123 grams of a Isocyanate hardener #2. This mixture with a theoretical VOC of zero was sprayed on panels and cured at ambient room conditions. A hard, chemically resistant film was formed.

Example 4

| Ingredient | Amount (grams) |
| --- | --- |
| White Mill Base | 115.0 |
| Aldimine #1 | 101.0 |

The White Mill Base was charged into a nine ounce glass jar. To disperse the pigment 300 grams of 1.602.0 mm zirconia/silica beads were added to the jar. The jar was sealed and put on a Cyclone air operated paint shaker for thirty minutes resulting in a grind of 8 Hegman. To convert the mill base, Aldimine #1 was added and then shaken for additional 5 minutes. The resulting paint recovered by filtration has a viscosity of 27 seconds #4 Ford cup. After three weeks Examples 3 and 4 were found to be fluid, stable, and completely free of any pigment settling.

Examples 3 and 4 illustrate that stable, low viscosity dispersions containing little or no organic solvents can be made using aldimine as the dispersant.

Examples 5–7

These examples include the following ingredients:

ALDIMINE #1 (see above).

KETIMINE #1 is the reaction product of one mole of isophorone diisocyanate with two moles of methyl isobutyl ketone.

SECONDARY AMINE #1 is the reaction product of one mole of 4,4' Methylenebis-2-methylcyclohexanamine with 2 mole of diethyl maleate.

ISOCYANATE HARDENER #2 (see above).

ISOCYANATE HARDENER #3 hexamethylene diisocyanate biuret.

PIGMENT WETTING AGENT is a solution of a salt of unsaturated polyamine amides and high molecular weight acidic esters that is electroneutral. An example of a product of this type is Anti-Terra® U (BYK-Chemie USA, Wallingford, Conn.).

ANTISETTLING AGENT is an organic rheological additive of a proprietary composition. An example of a product of this type is M-P-A® 1078X (Rheox, Hightstown, N.J.).

The examples illustrate curable pigmented primer surfacer compositions according to the claimed invention having a 2.1 VOC formulated by blending the following constituents in the amounts indicated.

| Ingredient | Ex. 5 | Ex. 6 Amount (grams) | Comparison Ex. 7 Amount (grams) |
| --- | --- | --- | --- |
| Secondary Amine #1 | 4.61 | 7.95 | — |
| Methyl Amyl Ketone | 2.51 | — | — |
| Methyl Isobutyl Ketone | 3.40 | — | — |
| Propylene glycol monomethyl ether acetate | — | 3.43 | — |
| n-hexyl acetate | — | 2.28 | — |
| n-butyl acetate | — | — | 8.54 |
| Trialkylaryl ammonium hectorite | 0.14 | 0.14 | 0.15 |
| High speed disperse for 15 minutes. Add the following in order with agitation: | | | |
| Pigment Wetting Agent | 0.54 | 0.54 | 0.79 |
| Antisettling Agent | 0.29 | 0.29 | 0.29 |
| High Speed disperse for 15 minutes at 40° C. Add the following with agitation: | | | |
| Titanium Dioxide | 6.80 | 6.86 | 6.91 |
| Yellow Iron Oxide | 0.29 | 0.29 | 0.29 |
| Magnesium Silicate | 5.10 | 5.14 | 5.18 |
| Barium Sulfate | 19.57 | 19.72 | 19.88 |
| Zinc Phosphate | 11.90 | 11.99 | 12.09 |
| Grind to 20 microns. Add the following: | | | |
| Methyl propyl ketone | 2.52 | — | — |
| n-butyl acetate | — | 2.54 | 1.84 |
| Ketimine #1 | 13.43 | — | — |
| Aldimine #1 | — | 10.73 | 16.34 |
| When ready to apply, premix the following and add to the above. | | | |
| Isocyanate #4 | 5.30 | 5.17 | — |
| Methyl amyl ketone | 4.31 | 4.11 | 3.68 |
| Isocyanate #3 | 15.91 | 15.51 | 21.72 |
| Methyl propyl ketone | 3.38 | 3.31 | 2.30 |
| Total | 100.00 | 100.00 | 100.00 |

The coatings were prepared by first combining the first seven ingredients in a suitable vessel with agitation. This mixture was then high speed dispersed with a Cowles blade for 15 minutes. The next two ingredients were then added in order and high speed dispersed for 15 minutes at a temperature of 40° C. The remaining pigments were then added with high speed dispersion. Agitation continued for 15 minutes, then the mixture was ground to 20 microns with 1.1 mm zirconium shot in a high density polyethylene shaker mill. The mill was drained, and the next four ingredients were added with agitation to create the primer base component.

To prepare the primer for application, the last four ingredients were blended together, then added to the primer base component and blended immediately prior to application.

| Physical Properties | Ex. 5 | Ex. 6 | Ex. 7 |
| --- | --- | --- | --- |
| Spray Viscosity #4 Ford Cup | 18 sec. | 16 sec. | 16 sec. |
| Pot Life (Time for viscosity to reach 35 sec.) | 50 min | 120 min. | 240 min. |
| VOC (lb/gal) Theoretical | 2.002 | 2.029 | 2.001 |
| VOC (lb/gal), ASTM D-3960-90 | 2.49 | 2.19 | 2.08 |

-continued

| Physical Properties | Ex. 5 | Ex. 6 | Ex. 7 |
|---|---|---|---|
| Pigment/Binder Ratio | 1.13:1.0 | 1.14:1.0 | 1.16:1.0 |
| Lb/gal, ASTM D-1475-90 | 11.69 | 11.99 | 11.82 |

The resulting primers were sprayed and cured at ambient conditions (25° C., 55% RH). All three systems sanded well and possessed a proper level of desired properties expected of primer-surfacers. As illustrated, the use of aldimine ensures consistency of theoretical versus determined VOC results, while maintaining sufficient properties.

Example 8

A pigmented thermoplastic lacquer coating composition was made using an aldimine dispersion by blending the following ingredients as indicated.

WHITE BASE 115.0 grams of white Mill base and 101.0 grams of Aldimine #1 according to Example 4.

ACRYLIC LACQUER CLEAR Alpha-Cryl™ 827 Clear (available from BASF Corp.).

ACRYLIC LACQUER THINNER Alpha-Cryl™ PNT90 (available from BASF Corp.).

| Ingredient | Amount (grams) |
|---|---|
| White Base | 15.0 |
| Acrylic Lacquer Clear | 37.5 |
| Acrylic Lacquer Thinner | 15.0 |

The above ingredients were mixed until uniform and then cast on a glass plate using a draw down bar. A dry, hard film was formed within ten minutes.

We claim:

1. A coating composition comprising only non-hydroxy functional resin and consisting essentially of a) a secondary amine reactive diluent, and b) aldimine having the formula

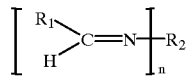

wherein n averages greater than 1, $R_1$ is alkyl, aryl, cycloaliphatic or substituted alkyl, aryl, cycloaliphatic or heterocyclic group, and $R_2$ is monomeric or polymeric aliphatic, aromatic, arylaliphatic or cycloaliphatic group which may contain O, N, S, or Si, c) an isocyanate compound having uretedione functionality, d) at least one moisture absorbing compound, and e) acid catalyst, and f) pigment, wherein the coating composition demonstrates increased pot life and decreased dry time.

2. The coating composition of claim 1 wherein the isocyanate functional compound comprises i) 5–100% of a compound selected from the group consisting of aliphatic, aromatic, and cyloaliphatic uretediones and mixtures thereof, and ii) 0–95% of a compound selected from the group consisting of aliphatic, aromatic, and cycloaliphatic isocyanurates, biurets, allophanates, oxadiazenetriones and isocyanate functional polymers.

3. The coating composition of claim 1 wherein the isocyanate functional component is selected from the group consisting of aliphatic, aromatic and cycloaliphatic uretdione.

4. The coating composition of claim 1, wherein the volatile organic content is less than 2.2 pounds per gallon.

5. The coating composition of claim 1 wherein the volatile organic content is less than 1.0 pound per gallon.

* * * * *